United States Patent
Llopiz-Capote et al.

(10) Patent No.: US 8,763,929 B2
(45) Date of Patent: Jul. 1, 2014

(54) RIDING ROTARY PRESSURE WASHER

(76) Inventors: Jose Antonio Llopiz-Capote, Miami, FL (US); Onier Llopiz, Miami Shores, FL (US)

(*) Notice: Subject to any disclaimer, the term of this patent is extended or adjusted under 35 U.S.C. 154(b) by 789 days.

(21) Appl. No.: 13/039,805

(22) Filed: Mar. 3, 2011

(65) Prior Publication Data
US 2012/0222909 A1 Sep. 6, 2012

(51) Int. Cl.
*A01G 25/09* (2006.01)
*E01C 19/16* (2006.01)
*B05B 3/00* (2006.01)
*B05B 3/18* (2006.01)
*B08B 3/02* (2006.01)
*A01D 34/00* (2006.01)
*A47L 11/40* (2006.01)
*E01H 1/10* (2006.01)
*B05B 3/06* (2006.01)
*B05B 13/00* (2006.01)

(52) U.S. Cl.
CPC . *B08B 3/024* (2013.01); *B05B 3/06* (2013.01); *A01D 34/003* (2013.01); *B05B 13/005* (2013.01); *A47L 11/408* (2013.01); *E01H 1/101* (2013.01)
USPC .......... 239/172; 239/264; 239/265; 239/722; 239/754; 56/16.8

(58) Field of Classification Search
USPC ......... 239/104, 172, 175, 261, 264, 265, 722, 239/754; 56/16.8; 180/291
See application file for complete search history.

(56) References Cited

U.S. PATENT DOCUMENTS

| | | | | |
|---|---|---|---|---|
| 5,004,156 | A * | 4/1991 | Montanier | 239/130 |
| 5,195,308 | A * | 3/1993 | Grote et al. | 56/16.4 R |
| 7,043,890 | B2 * | 5/2006 | Lofton | 56/16.8 |
| 8,016,947 | B2 * | 9/2011 | Rushin et al. | 134/18 |
| 8,061,373 | B1 * | 11/2011 | Storms | 134/174 |

* cited by examiner

*Primary Examiner* — Ryan Reis
(74) *Attorney, Agent, or Firm* — Ruben Alcoba, esq.

(57) ABSTRACT

A riding rotary pressure washer comprising of a four wheeled powered vehicle, a circular cover that houses a balance spray bar assembly, the circular cover is adjustably attached to the four wheeled vehicle and is positioned between the wheels of the vehicle, a first L-shaped hose guide, the first L-shaped hose guide is attached to the rear of the four wheeled vehicle, a hose, the hose is attached to the balance spray bar assembly and guided through the first L-shaped hose guide, and a remote pressure washer system, the remote pressure washer system attaches to the hose of the riding rotary pressure washer.

2 Claims, 5 Drawing Sheets

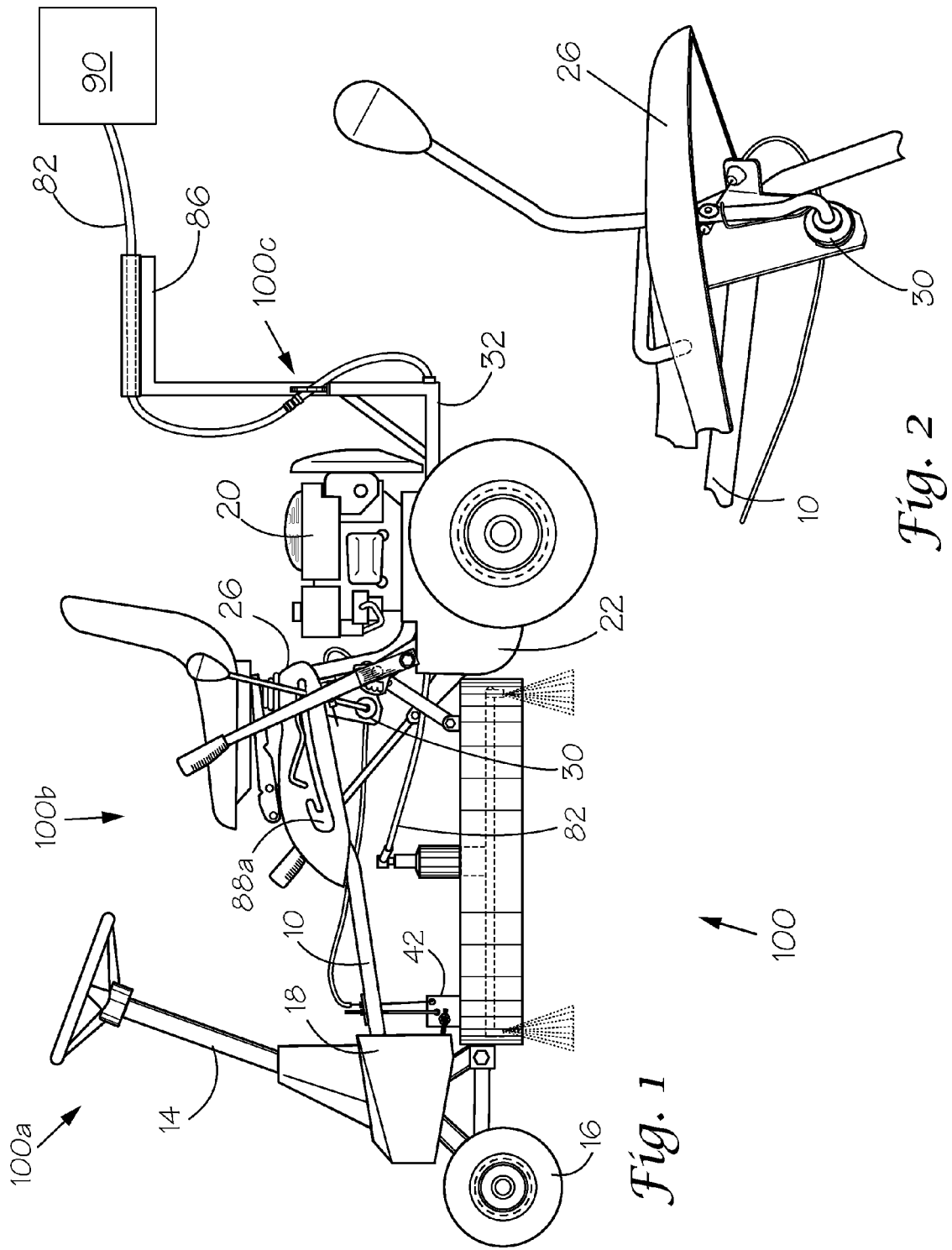

RIDING ROTARY PRESSURE WASHER

BACKGROUND

The present invention is directed toward a riding rotary pressure washer for washing flat surfaces.

The inventor of the present invention has worked in the pressure cleaning industry for the past 30 years. During this period the inventor realized that there was the need for an inexpensive riding rotary pressure washer that could be used to wash residential and commercial business locations.

The inventor is aware of industrial rotary pressure washers used to wash large commercial spaces, yet those rotary pressure washers cannot be used to wash smaller areas; such as sidewalks, corners, and internal structures.

He therefore conceived of a riding rotary pressure washer that could be used to wash the areas mentioned above. One of the reasons the inventor conceived the present invention is that he suffers from physical ailments that make it very difficult for him to use non-rideable rotary pressure washers.

The inventor conceived that if he could modify a riding lawnmower to carry a rotary pressure washer cover underneath its structure that he could provide a riding pressure washer to individuals in his industry.

He realized that he needed to place the cover of the rotary pressure washer between the axels of a vehicle. The placement of the cover would allow him to drive the vehicle effectively around obstacles without having to worry that the cover would contact the obstacles, thereby either damaging the obstacles or the washer.

The benefit of having a riding rotary pressure washer that is the size of a riding lawnmower is that it allows the user to maximize the amount of space washed. For example, if a commercial pressure washer is used to wash a gas station, the area that has to be manually washed is greater that the area that would be washed using the present invention, for his riding rotary pressure washer can effectively get closer to obstacles and is easier to maneuver than a commercial pressure washer such as the CYCLONE LP 4500. Larger riding rotary washers are not suitable for smaller areas because of their turning radius and because of their weight.

The present invention was conceived to allow a user to wash smaller areas in a time efficient manner and to prevent the weight of the washer from cracking the areas washed. The size of the present washer also allows the user to be able to transport the washer in smaller vehicles, such as vans or pickup trucks.

For the foregoing reasons, there is a need for a riding rotary pressure washer that could be used to wash flat surfaces. The riding rotary pressure washer should be easily maneuverable, easily transportable, inexpensive to manufacture, and light weight.

SUMMARY

The present invention is directed to a riding rotary pressure washer that is used to wash flat surfaces. The riding rotary pressure washer is easily maneuverable, easily transportable, inexpensive to manufacture, and light weight.

A riding rotary pressure washer comprising of a four wheeled powered vehicle, a circular cover that houses a balance spray bar assembly, the circular cover is adjustably attached to the four wheeled vehicle and is positioned between the wheels of the vehicle, a first L-shaped hose guide, the first L-shaped hose guide is attached to the rear of the four wheeled vehicle, a hose, the hose is attached to the balance spray bar assembly and guided through the first L-shaped hose guide, and a remote pressure washer system, the remote pressure washer system attaches to the hose of the riding rotary pressure washer.

An object of the present invention is to provide a riding rotary pressure washer that is inexpensive to manufacture.

Another object of the present invention is to provide a riding pressure washer that is easily maneuverable.

Yet another object of the present invention is to provide a riding pressure washer that is easily transportable.

A further object of the present invention is to provide a riding pressure washer that is lightweight.

DRAWINGS

These and other features, aspects, and advantages of the present invention will become better understood with regard to the following description, appended claims, and drawings where:

FIG. 1 is a side view that shows the riding rotary pressure washer of the present invention;

FIG. 2 is a side view that shows the support cover and some aspects of the lever mechanism of the present invention;

DESCRIPTION

A riding rotary pressure washer for washing flat surfaces, As seen in FIG. 1, the riding rotary pressure washer comprises of a four wheeled powered vehicle, the vehicle comprises of a front, middle, and rear section.

Figure 2A:
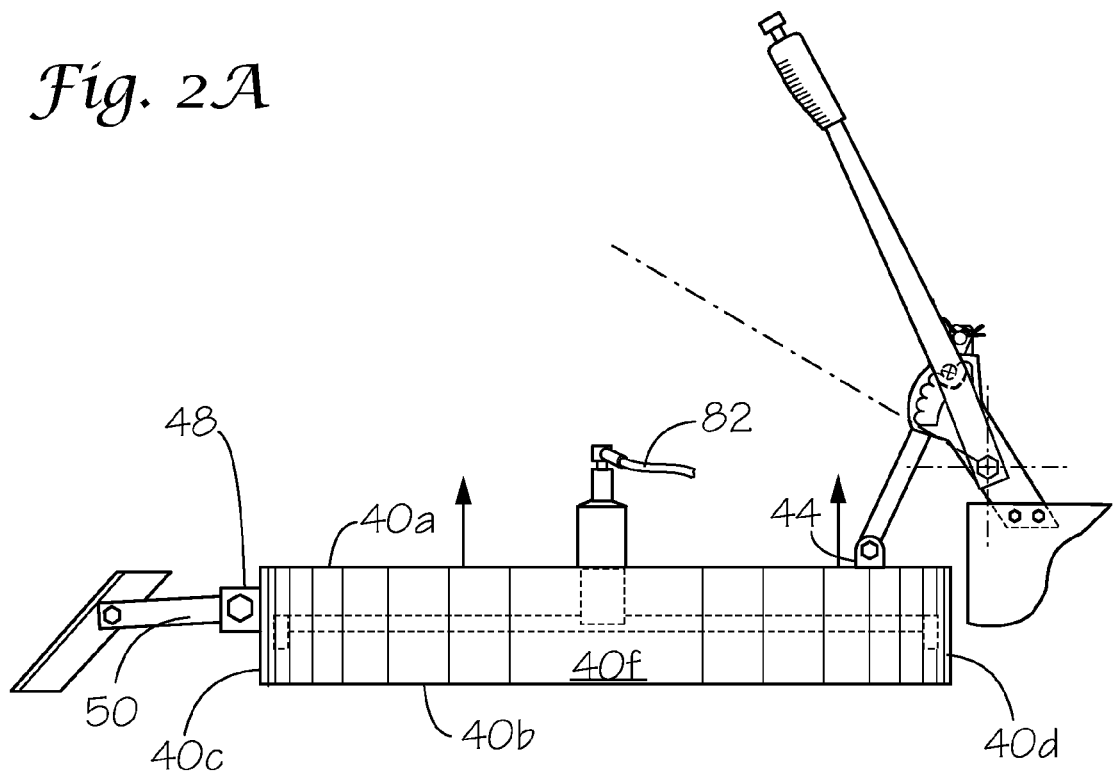
FIG. 2a is a side view that shows how the circular cover of the present invention attaches to the front and rear of the riding rotary pressure washer.
Figure 2B:
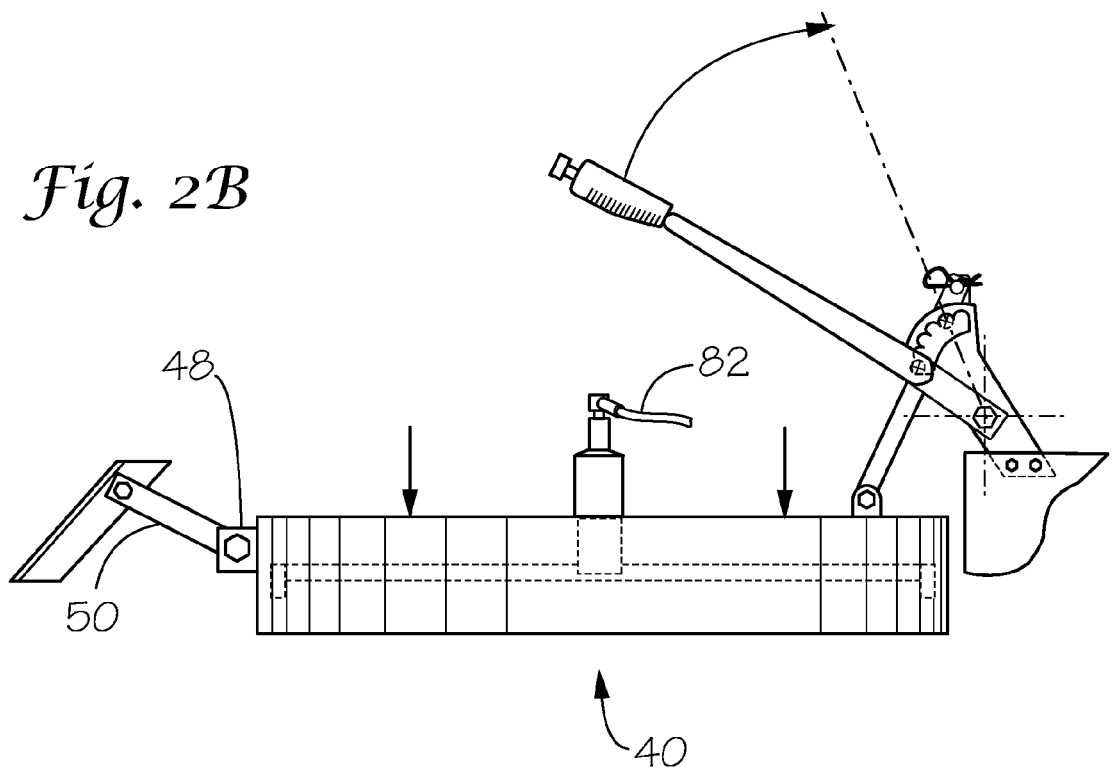
FIG. 2b is another side view that shows how the circular cover of the present invention attaches to the front and rear of the riding rotary pressure washer in a pivoted position.
Figure 3A:
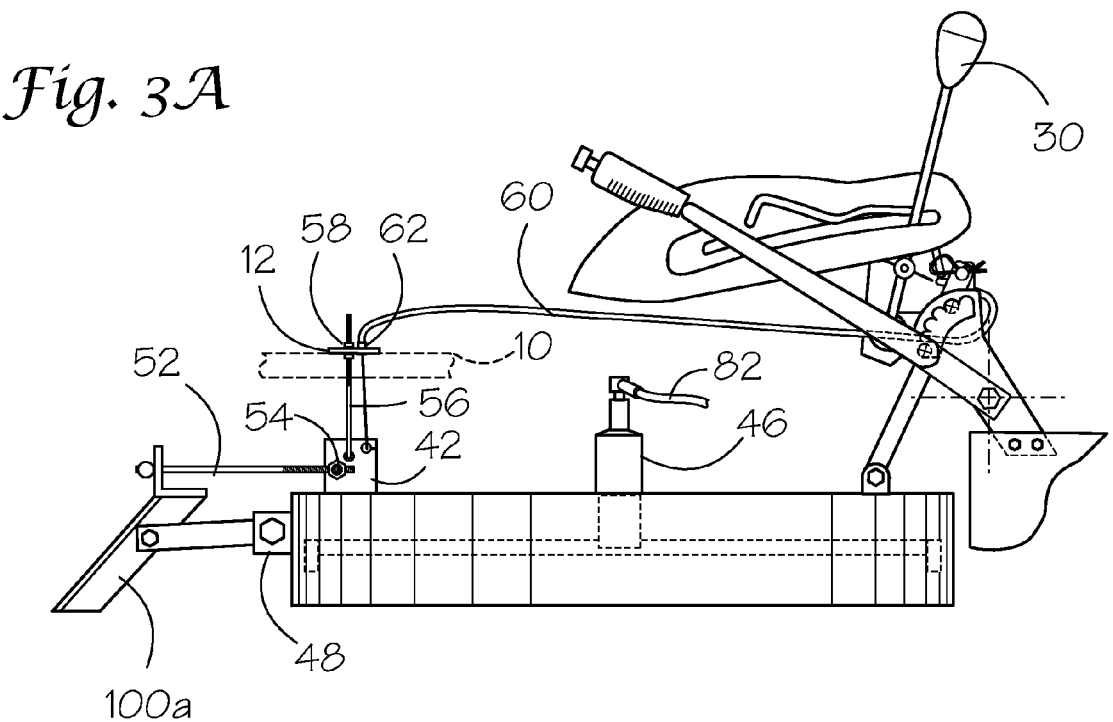
FIG. 3a is a side view that shows how the circular cover of the present invention attaches to the front and rear of the riding rotary pressure washer and how the lever mechanism attaches to the circular cover in a first position.
Figure 3B:
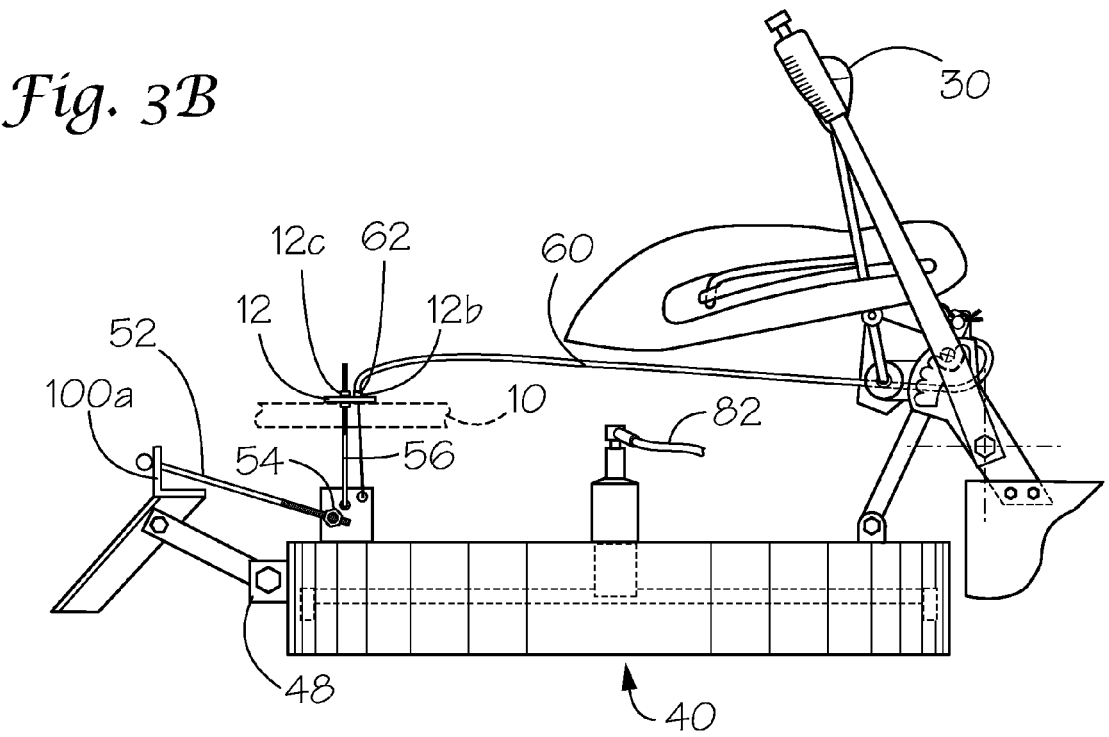
FIG. 3b is another side view that shows how the circular cover of the present invention attaches to the front and rear of the riding rotary pressure washer and how the lever mechanism attaches to the circular cover in a second position.

As seen in FIGS. 1, 3a-b, the vehicle has a frame 100, the frame has a front 100a, middle 100b, and rear 100c section that comprise of two parallel bars 10 (one of the parallel bars 10 is not seen in figures) that connect the front 100a and rear 100c sections of the vehicle, a support plate 12 permanently attached to each bar 10 at a position that is adjacent to the front section of the frame 100a, the support plate 12 defines a first 12a and a second 12b aperture. The vehicle has a turning mechanism 14 in the front section of the vehicle. The turning mechanism 14 is connected to two front wheels 16. The vehicle further has a breaking mechanism 18 in the front section of the vehicle. The breaking mechanism 18 breaks the two front wheels 16. The vehicle also has a motorized driving mechanism 20 in the rear section of the vehicle 100c. The motorized driving mechanism 20 is mounted on a rear plate structure 22 as are two rear wheels 24 that are connected to the driving mechanism 20. The vehicle further has a support cover 26 in the rear section 100c of the vehicle. The support cover 26 supports a seat 28, and the support cover 26 defines a hooked-shaped aperture 28a for moving a lever mechanism 30 from a first position to a second position. The lever mechanism 30 attaches to the support cover 26. The support cover 26 attaches to the rear section of the frame 100c. The vehicle further has a first L-shaped hose guide 32 permanently attached to the rear section 100c of the vehicle.

As seen in FIGS. 2a-4, the vehicle further comprises of a circular cover 40, the circular cover 40 has a top 40a, bottom 40b, front 40c, rear 40d, inner 40e, and outer side 40f, the front 40c top 40a of the cover 40 defines a centrally positioned top anchor 42. The top anchor 42 defines two top anchor apertures 42a and a cover stabilizing receiver 42b, the rear 40d top 40a of the cover defines two pivot anchors 44, the two pivot anchors 44 are parallel to each other and equally distanced from the rear of the cover 40d, the circular cover 40 defines a cover central aperture 46, the circular cover further defines two outer side anchors 48 (one of the outer side anchors is not seen in figures, for FIGS. 3a-b are side views), the outer side anchors 48 are positioned equally distanced from the front of the cover 40c and are parallel to each other.

As seen in FIGS. 2a-3b, the vehicle further comprises of a pair of front support bars 50 (only one support bar is seen in Figs.), each support bar 50 pivotally attaches to the front of the vehicle 100a and to each circular cover outer side anchor 48, the anchors are equally spaced from a central position of the front side 40c of the circular cover 40.

As seen in FIGS. 3a-b, the vehicle further comprises of a front section central bar 52, the central bar 52 attaches to the front of the vehicle 100a and to the cover stabilizing receiver 54. The vehicle also has an adjustable positioning rod 56, the positioning rod 56 is attached to the top anchor 42 of the cover and to the first aperture 58 of the support plate 12. The vehicle further has a cover adjusting cable 60, the cable 60 attaches to the anchor of the cover 42 and is passed through the second aperture 62 of the support plate 12 and then connects to the lever mechanism 30.

Figure 4:
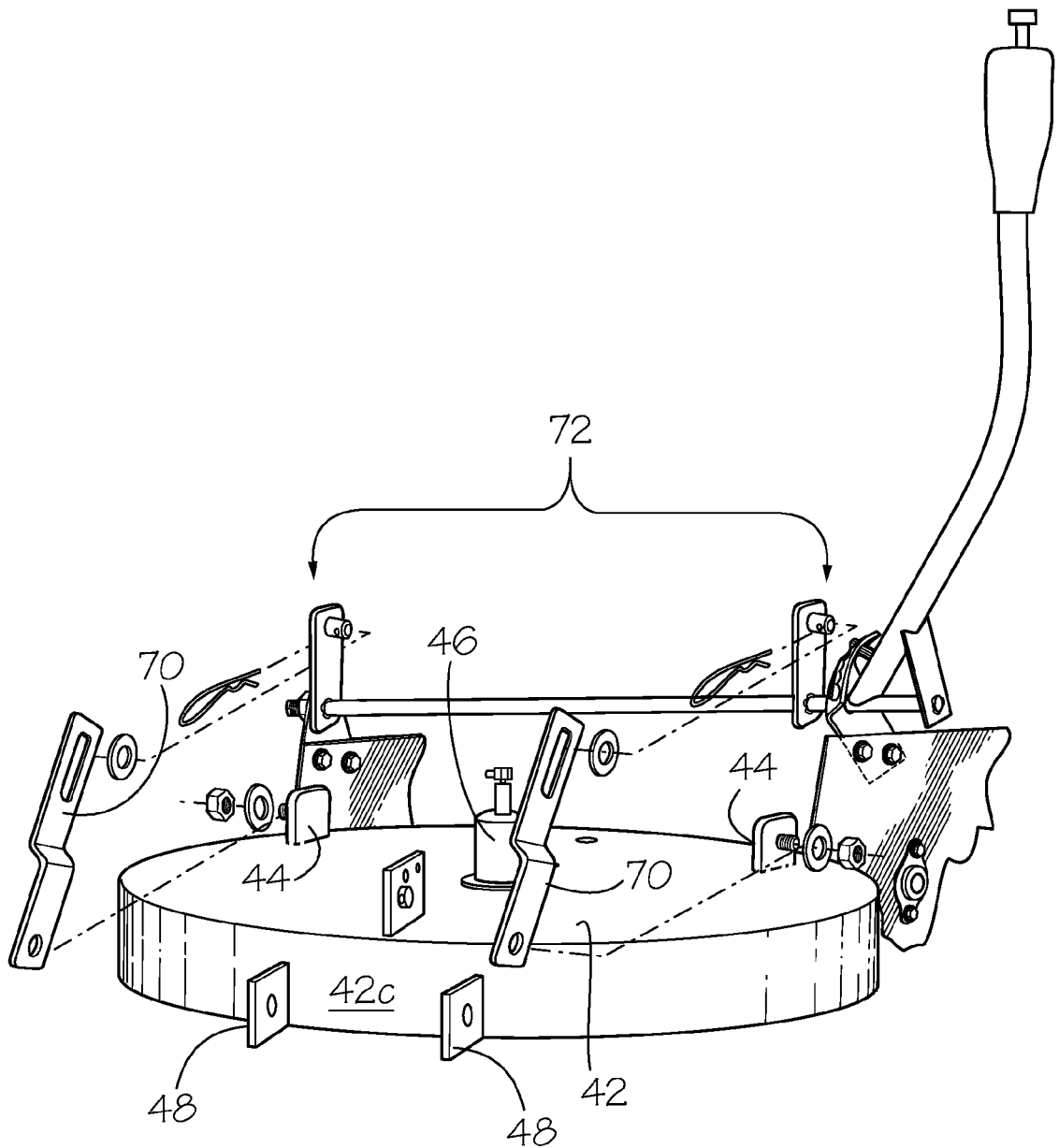
FIG. 4 is a perspective view showing how the rear lifting mechanism is connected to the circular cover.

As seen in FIG. 4, the vehicle further comprises of a pair of rear support cover bars 70, each rear support cover bar 70 is attached to each pivot cover anchor 44 of the top side 40a of the cover 40. The vehicle also has a rear lifting mechanism 72 attached to the rear plate structure 22, the rear lifting mechanism 72 is attached to each rear support cover bar 70.

Figure 5:
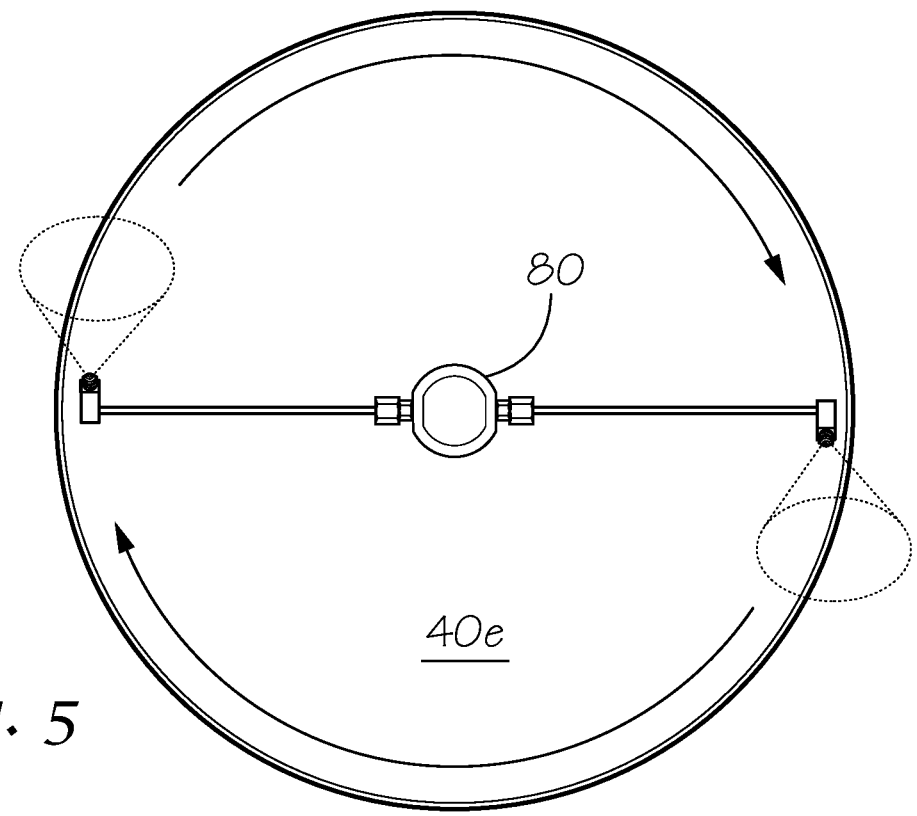
FIG. 5 is a bottom plan view showing the balance spray bar assembly of the present invention within the circular cover.
Figure 6:
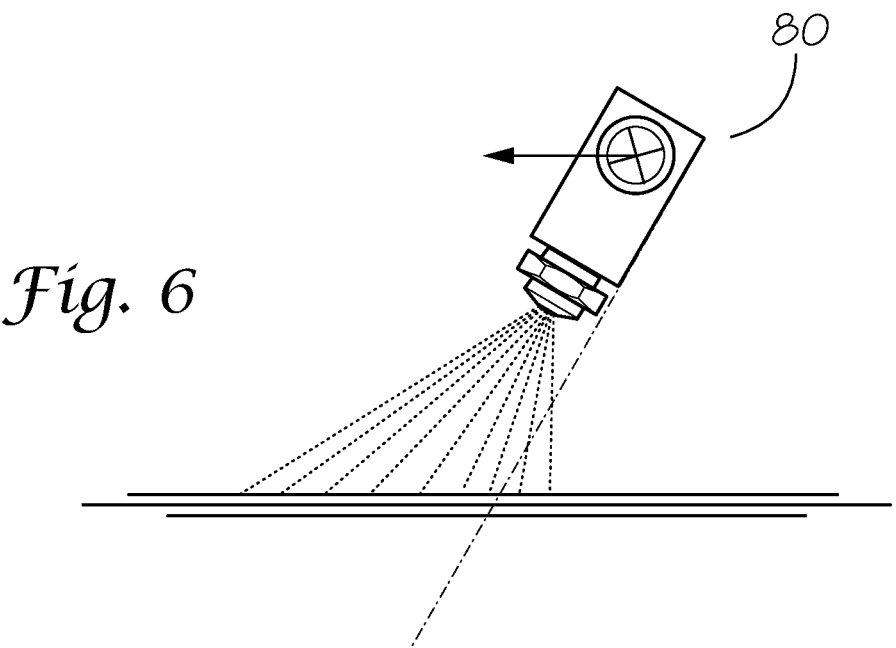
FIG. 6 is the spray nozzle of the balance spray bar.

As seen in FIGS. 5-6, the vehicle further comprises of a balance spray bar assembly 80, the balance spray bar assembly 80 is housed within the inner side of the cover 40e and is attached to the cover 40 through the cover central aperture 46.

As seen in FIG. 1, the vehicle further comprises of a hose 82, the hose is attached to the balance spray bar assembly 80 and is guided through the first L-shaped hose guide 32. Lastly, in the first embodiment, the vehicle further comprises of a remote pressure washer system 90, the remote pressure washer system 90 attaches to the hose 82.

In another embodiment of the present invention, as seen in FIG. 1, the rotary pressure washer further comprises of a second L-shaped hose guide 86, the second L-shaped hose guide 86 is mounted on the first L-shaped hose guide 32 and points away from the front of the vehicle 100a.

An advantage of the present invention is that it provides a riding rotary pressure washer that is inexpensive to manufacture.

Another advantage of the present invention is that it provides a riding rotary pressure washer that is easily maneuverable.

Yet another advantage of the present invention is that it provides a riding rotary pressure washer that is easily transportable.

A further advantage of the present invention is that it provides a riding rotary pressure washer that is lightweight.

Although the present invention has been described in considerable detail in reference to certain preferred versions thereof, other versions are possible. Therefore, the spirit and scope of the claims should not be limited to the description of the preferred versions contained herein.

What is claimed is:
1. A riding rotary pressure washer comprises:
a four wheeled powered vehicle, the vehicle comprises of a front, middle, and rear section, the vehicle having:
 a frame, having a front, middle, and rear sections comprising of two parallel bars connecting the front and rear sections of the vehicle;
 a support plate permanently attached to each bar at a position that is adjacent to the front section of the frame, the support plate defines a first and a second aperture;
 a turning mechanism in the front section of the vehicle, the turning mechanism is connected to two front wheels;
 a breaking mechanism in the front section of the vehicle, the breaking mechanism breaks the two front wheels;
 a motorized driving mechanism in the rear section of the vehicle, the motorized mechanism is mounted on a rear plate structure as are two rear wheels that are connected to the driving mechanism;
 a support cover in the rear section of the vehicle, the support cover supports a seat, and the support cover defines an hook-shaped aperture for moving a lever mechanism from a first position to a second position, the lever mechanism attaches to the support cover, the support cover attaches to the rear section of the frame; and
 a first L-shaped hose guide permanently attached to the rear section of the vehicle;
a circular cover, the cover has a top, bottom, front, rear, inner, and outer side, the front top of the cover defines a centrally positioned top anchor, the top anchor defines two top anchor apertures and a cover stabilizing receiver, the rear top of the cover defines two pivot anchors, the two pivot anchors are parallel to each other and equally distanced from the rear of the cover, the circular cover defines a cover central aperture, the circular cover further defines two outer side anchors, the outer side anchors are positioned equally distanced from the front of the cover and are parallel to each other;
a pair of front support bars, each support bar pivotly attaches to the front of the vehicle and to each circular cover outer side anchor;
a front section central bar, the central bar attaches to the front of the vehicle and to the cover stabilizing receiver;
an adjustable positioning rod, the positioning rod is attached to one the top anchor of the cover and to the first aperture of the support plate;
a cover adjusting cable, the cable attaches to the top anchor of the cover and is passed through the second aperture of the support plate and then connects to the lever mechanism;
a pair of rear support cover bars, each rear support cover bar is attached to each pivot anchor of the top side of the cover;
a rear lifting mechanism attached to the rear plate structure, the rear lifting mechanism is attached to each rear support cover bar;

a balance spray bar assembly, the balance spray bar assembly is housed within the inner side of the cover and is attached to the cover through the cover central aperture;

a hose, the hose is attached to the balance spray bar assembly and is guided through the first L-shaped hose guide; and a remote pressure washer system, the remote pressure washer system attaches to the hose.

2. The riding rotary pressure washer of claim 1, further comprising a second L-shaped hose guide, the second L-shaped hose guide is mounted on the first L-shaped hose guide and points away from the front of the vehicle.

* * * * *